(12) United States Patent
Maegli et al.

(10) Patent No.: US 7,186,432 B2
(45) Date of Patent: Mar. 6, 2007

(54) SHELF STABLE MELTABLE PARTICULATE FOOD PRODUCT

(75) Inventors: Jack William Maegli, Beloit, WI (US); Dustan Theodore Doud, Clinton, WI (US); Ellen Kay Morgan, Madison, WI (US); Susan Mary Bischel, Rockton, IL (US)

(73) Assignee: Kerry Inc., Beloit, WI (US)

( * ) Notice: Subject to any disclaimer, the term of this patent is extended or adjusted under 35 U.S.C. 154(b) by 389 days.

(21) Appl. No.: 10/649,825

(22) Filed: Aug. 28, 2003

(65) Prior Publication Data

US 2004/0086598 A1    May 6, 2004

Related U.S. Application Data

(60) Provisional application No. 60/443,183, filed on Jan. 29, 2003, provisional application No. 60/422,110, filed on Oct. 30, 2002.

(51) Int. Cl.
*A23L 1/05* (2006.01)

(52) U.S. Cl. .............. 426/573; 426/574; 426/582; 426/585; 426/602

(58) Field of Classification Search ............ 426/573, 426/574, 654, 656, 582, 585, 601, 613
See application file for complete search history.

(56) References Cited

U.S. PATENT DOCUMENTS

| | | | |
|---|---|---|---|
| 3,851,083 A * | 11/1974 | Brooking et al. ........ 426/654 |
| 3,857,977 A | 12/1974 | Huessy | |
| 3,959,511 A | 5/1976 | Balaz et al. | |
| 4,112,125 A | 9/1978 | Chesnut et al. | |
| 4,232,050 A * | 11/1980 | Rule et al. ............ 426/582 |
| 4,721,622 A * | 1/1988 | Kingham et al. ........ 426/94 |
| 4,748,041 A | 5/1988 | Player et al. | |
| 5,298,268 A | 3/1994 | Maegli | |
| 5,935,634 A * | 8/1999 | Gamay et al. ........ 426/582 |
| 6,299,916 B1 * | 10/2001 | Dally et al. ............ 426/94 |
| 6,863,911 B2 * | 3/2005 | Zimeri et al. .......... 426/94 |
| 2002/0155198 A1 | 10/2002 | Wang et al. | |

FOREIGN PATENT DOCUMENTS

EP    0 750 843 A2    1/1997

OTHER PUBLICATIONS

Declaration Under 37 C.F.R. 1.132 of Jack William Maegli.

* cited by examiner

*Primary Examiner*—Keith Hendricks
*Assistant Examiner*—Kelly Mahafkey
(74) *Attorney, Agent, or Firm*—Birch, Stewart, Kolasch & Birch, LLP

(57) ABSTRACT

A savory, shelf-stable, particulate, meltable, food-grade plasticized composition is disclosed, having a water activity $A_w$ of 0.70 or below. The composition is an oil-in-water emulsion of: a protein that forms a thermally reversible meltable gel, plasticizer components to solubilize the protein, comprising a polyol plasticizer and a non-polyol plasticizer, a level of an edible oil component sufficient to provide proper texture, mouthfeel, and melt characteristics to the plasticized composition, and a savory flavoring component, and typically comprises 10–30 wt-% protein, 15–50 wt-% plasticizer component, including, based upon the total weight of the composition, 10–40 wt-% polyol plasticizer and 3–15 wt-% non-polyol plasticizer, 10–40 wt-% oil component, 5–25 wt-% moisture, and 10–40 wt-% flavor characterizing component.

9 Claims, No Drawings

SHELF STABLE MELTABLE PARTICULATE FOOD PRODUCT

This application claims benefit of provisional application 60/443,183 filed Jan. 29, 2003 and of provisional application 60/422,110 filed Oct. 30, 2002.

FIELD OF THE INVENTION

This invention provides a low water activity ($A_w \leq 0.70$) shelf stable cheese shred-like edible fabricated food product or similar product, designed to be melted onto foods such as snack foods including corn chips, tortilla chips, and potato chips. So used, this product will have an appearance similar to that of freshly melted cheese, such as Cheddar or Monterey Jack or Parmesan cheese. Similar products contemplated by this invention can have savory flavors other than cheese, as described hereinbelow.

The products of the present invention are low enough in water activity to preclude microbial growth or water migration, and subsequent staling issues, in the cereal-based snack substrates to which they are adhered, but are virtually indistinguishable in texture, function, appearance (translucence), and flavor, before or after melting, from real cheese. Other savory flavors, including for instance tomato, sour cream, beef gravy, etc., are within the scope of the invention in applications where ambient shelf stability and a meltable character is important.

The compositions of the present invention include polyol plasticizers, non-polyol plasticizers, caseinates or similar proteins, partially hydrogenated or similar edible oils, water, and flavoring agents.

BACKGROUND OF THE INVENTION

Flavor-coated dry snack products, such as potato chips, tortilla chips, and the like, have traditionally used a combination of oil and dry seasoning as a flavor delivery system. The oil is primarily used to provide adhesion of the seasoning to the snack substrate. In its absence, the dry seasoning would generally fall off. The oil can come from residual frying oil from prior cooking of the snack substrate (e.g., the oil on the surface of potato chips), or it may be blended with the seasoning to form a colloidal suspension (slurry), which is then sprayed onto the product. Alternatively, the seasoning may be applied after the snack substrate is coated with oil, in a device such as a tumble coating drum. Coating systems that may be used to carry out these coating procedures are available from Spray Dynamics (St. Clair, Minn.) and Allen Systems (Newberg, Oreg.).

Snack products manufactured by the above methods are acceptable overall in terms of flavor, but they lack the "fresh" and eclectic texture and individual component flavor-release attributes of an appetizer with toppings. Most topped appetizers are assembled fresh, utilizing high moisture topical ingredients such as cheese, sour cream, fried sausage or pepperoni, and the like. While providing an initially acceptable textural dichotomy—dry crispy grain-based substrate with soft toppings—with time the moisture migrates from the toppings into the cereal substrate. This manifests itself initially as a softening of the substrate, followed subsequently by staling as moisture is lost to the atmosphere. Microbial growth in the toppings also renders these products of short shelf life (typically, less than a day). They are also not well suited for "in the bag" delivery—as is desirable for shelf stable dry snacks—inasmuch as there is no adhesion mechanism employed to keep them bound to the substrate.

U.S. Pat. No. 4,112,125 discloses a semi-moist, semi-soft, shelf-stable and non-bleeding particle for carrying a food flavor. The compositions from which the particles are made comprise 5–30% protein, 5–70% gelatinized starch, 5–40% vegetable fat, and at least one of 5–50% dextrose and 5–50% sucrose. The moisture content ranges from 2–30%. The patent teaches that the particles are useful in various conventional food compositions, such as dry muffin and cake mixes. However, the presence of starch in these products would prevent a product such as a cheese shred from melting and adhering to a snack substrate.

U.S. Pat. No. 4,748,041 discloses an edible, lipid-based squeezable, flavored savory shelf-stable composition designed to be shelf-stored in a deformable plastic bottle. The composition contains lipid, emulsifier, and bulking agent, and has a paste consistency or stand-up similar to that of a cheese dip. The product is not a true gel structure but instead is a squeezable liquid. During its shelf life, such a product would not stay bound in the regions to which it was applied in the manufacturing process.

U.S. Pat. No. 5,935,634 discloses shelf-stable cheese products with low water activity. The compositions are said not to require refrigeration and not to support the proliferation of microorganisms. The compositions described in the patent contain natural cheese, lactose, and humectants. The humectants may include lactates and polyols. At 40–70% natural cheese, these products carry too much water (>15%) to meet the low water activity standard ($A_w < 0.60$) of the present invention. It is noted, for instance, that Example 13 in the patent discloses a water activity of 0.826.

Combining the shelf stability of a flavor-coated dry snack product with the premium textural and flavor-release perception of an hors d'oeuvre has long been an elusive goal of snack producers.

SUMMARY OF THE INVENTION

It is an object of this invention to provide long term shelf stability to selected snack toppings without compromising the shelf life of the substrates with which they are associated, while at the same time maintaining natural texture and flavor-release attributes. In the case of a meltable cheese shred on a cereal-based chip, a combination of protein and a particular non-aqueous plasticizer system is used to achieve the gel texture while maintaining a low enough moisture content so that the snack chip base remains unaffected during shelf life. The topping embodiment is designed to have a specific melt point to facilitate adhesion to the snack chip and retail shelf life. This melt point must be low enough such that excessive temperatures need not be employed in binding to the snack substrate, but high enough such that melting does not occur during distribution. While the emphasis of the description which follows is associated with meltable cheese, similar product design principles in accordance with the present invention can provide other savory manifestations, such as tomato sauce, sour cream, and the like.

This invention provides a low-water-activity shelf-stable particulate edible food-grade plasticized composition that has a savory inclusion and that is formulated to be melted onto snack and other foods. The composition comprises: a protein such as sodium caseinate that forms a thermally reversible meltable gel; plasticizer components formulated to provide a fluid yet anhydrous medium which, in combination with water, allows the protein to solubilize, while enabling achievement of a cheese-like, tomatoey, or other desired flavor in the plasticized composition, said plasticizer components comprising a polyol plasticizer such as glycerin and a non-polyol plasticizer such as sodium lactate; a level of an oil such as partially hydrogenated soybean oil sufficient to provide proper texture, mouthfeel, and melt characteristics to the plasticized composition; and a savory characterizing flavor such as cheese or tomato or the like.

This invention also provides a process for producing a low-water-activity shelf-stable particulate edible food-grade plasticized composition having a savory inclusion and designed to be melted onto snack foods and the like. The process of this invention comprises the steps of: combining a protein that forms a thermally reversible meltable gel, plasticizer components including a polyol plasticizer and a non-polyol plasticizer, an edible oil, a savory inclusion, and water; heating the combined components to solubilize the protein and provide a cooked product; casting and cooling the cooked product; and shredding or otherwise preparing the product for consumption.

Thus, one embodiment of this invention is a savory, shelf-stable, particulate, meltable, food-grade plasticized composition having a water activity $A_w$ of 0.70 or below, preferably of less than or equal to about 0.60, more preferably of less than 0.50, and most preferably of less than or equal to about 0.43. The composition of the invention is an oil-in-water emulsion of: a protein that forms a thermally reversible meltable gel, plasticizer components to solubilize the protein, comprising a polyol plasticizer and a non-polyol plasticizer, a level of an edible oil component sufficient to provide proper texture, mouthfeel, and melt characteristics to the plasticized composition, and a savory flavoring component. The composition of the invention typically comprises 10–30 weight-% protein, 15–50 weight-% plasticizer component, including, based upon the total weight of the composition, 10–40 weight-% polyol plasticizer and 3–15 weight-% non-polyol plasticizer, 10–40 weight-% oil component, 5–25 weight-% moisture, and 10–40 weight-% flavor characterizing component.

In one example of a cheese-like composition of the invention, the protein is casein, the polyol plasticizer is glycerin, the non-polyol plasticizer is sodium lactate, the oil component is partially hydrogenated vegetable oil, and the flavoring component is a cheese flavor. This composition may comprise, for instance, about 18 weight-% casein, about 21 weight-% glycerin, about 7 weight-% sodium lactate, about 21 weight-% partially hydrogenated soybean oil, and about 24 weight-% cheese component. In another example, of a meat-like composition of the invention, the protein is casein, the polyol plasticizer is glycerin, the non-polyol plasticizer is sodium lactate, the oil component is stabilized animal fat, and the flavoring component is a meat flavor. This composition may comprise about 18 weight-% casein, about 20 weight-% glycerin, about 7 weight-% sodium lactate, about 18 weight-% stabilized animal fat, and about 25 weight-% meat extract and seasoning component. In yet another example of this invention, a vegetable-like composition, the protein is casein, the polyol plasticizer is glycerin, the non-polyol plasticizer is comprised of monosaccharides originating from the vegetable component, the oil component is partially hydrogenated vegetable oil, and the flavoring component is a vegetable flavor. This composition may comprise, for example, about 20 weight-% casein, about 17 weight-% glycerin, about 35 weight-% flavor characterizing vegetable component, about 20 weight-% partially hydrogenated soybean oil, and about 8 weight-% salt and seasoning component.

The present invention also provides a process for producing a low-water-activity shelf-stable particulate edible food-grade plasticized composition having a savory inclusion and designed to be melted onto snack foods and the like. The involves combining a protein that forms a thermally reversible meltable gel, plasticizer components including a polyol plasticizer and a non-polyol plasticizer, an edible oil, a savory inclusion, and water in an amount that provides a water activity $A_w$ of 0.70 or less, heating the combined components under agitation to solubilize the protein, establish a homogenous oil-in-water emulsion, and provide a cooked gel product, casting and cooling the cooked gel product, and shredding or grinding the cast cooked gel product for consumption. In this process, 10–30 parts by weight protein may be combined with 10–40 parts by weight polyol plasticizer, 3–15 parts by weight non-polyol plasticizer, 10–40 parts by weight oil component, 10–40 parts by weight flavoring component, and water in an amount that provides a cast cooked gel product having a water activity $A_w$ of less than about 0.50.

The process of this invention may be a batch process, in which the heating under agitation is conducted in a scraped-wall, pressure-jacketed, steam-heated vat. Alternatively, the process of the invention may be a continuous process. In the continuous process, heating under agitation may be conducted in a scraped-wall, pressure-jacketed, steam-heated vat into which the components of the composition are fed by means of a positive displacement stuffing pump. Also in the continuous process, the casting and cooling step may be conducted on a revolving belt equipped with a gauging roller that establishes product depth and equipped with a cooling medium on its non-product-contact surface side to effect conductive cooling.

DETAILED DESCRIPTION OF THE INVENTION

The functionality provided by this invention relies on both the composition of the formulation and proper processing conditions.

Formulations:

The formulations provided by the present invention include a Plasticizer System, a Protein, an Oil, and a Flavor Characterizing Ingredient. The formulations can be approximated to be within the following ingredient ranges:

| Ingredient | Generic Ranges |
| --- | --- |
| Plasticizer System (e.g., sodium lactate and glycerin or propylene glycol) | 15–50% |
| Casein (or similar protein) | 10–30% |
| Oil (e.g., partially hydrogenated vegetable oil | 10–40% |
| Flavor Characterizing Ingredient (e.g., 38% moisture Cheddar cheese) | 10–40% |
| Water (contingent on moisture content of Flavor Characterizing Ingredient) | 5–25% |
| Salt | 0–15% |
| Starch | <2% |
| Food Coloring | <2% |

The Plasticizer System.

The polyol plasticizer is a fluid yet anhydrous medium that in combination with water enables the protein to solubilize and exhibit the emulsifying and gelling characteristics of, for instance, wet cheese. Preferably, the polyol plasticizer is low in molecular weight and is sufficiently polar to facilitate solubility. Normally, the polyol plasticizer should remain in a fluid state in the finished composition. Polyol plasticizers which can be used in this invention include glycerin and propylene glycol.

It has been found, however, that polyols have sweet or bitter flavor characteristics that are not fully compatible with the target cheese flavor or other savory flavors. In order to provide a product which has a clean savory cheese or other flavor targeted by the present invention, therefore, it is necessary to include a non-polyol component such as sodium lactate, sodium acetate, or mono- or di-saccharides, e.g., maltose, as part of the total plasticizer system. Saccharides may be added separately, or may be provided to the system by a vegetable ingredient that also acts as a flavoring component. The compositions of this invention generally include 10–40 weight-% polyol plasticizer and 3–15 weight-% non-polyol plasticizer. Sodium lactate when used may be supplied as a solution having a pH of 6 and containing 40 weight-% moisture.

Water is the third important component of the plasticizer system. It provides for proper solubilization of the protein ingredient, but should not exceed amounts that would compromise shelf stability of the final product—that is, amounts manifesting into a water activity higher than about 0.70. It is preferred that for snack applications the compositions of this invention have a water activity of 0.60 or below, more preferably of less than 0.50, and most preferably of 0.43 or less. Because the Flavor Characterizing Ingredient may contain moisture, added water will have to be adjusted accordingly. In the case of a high moisture Flavor Characterizing Ingredient, such as tomato paste or full moisture cheese, additional water may not be necessary in the manufacture of such embodiments of this invention.

The Protein.

Casein is a preferred protein because it forms a thermally reversible meltable gel similar to that of natural cheese (melts when hot, coalesces when cooled). Other proteins that provide the compositions with an appropriate melt-coalescence profile can also be used. Proteins that can be used in accordance with this invention include corn zein, soy protein, and caseins. Gelatins tend to melt at too low of a temperature. Glutins, whey proteins, and the like tend to form solid rubbery matrices upon heating. The compositions of this invention generally include 10–30 weight-% caseinate or similar protein, with sodium caseinate having 10 weight-% moisture content being particularly preferred because it forms a soft gel and is highly reversible upon heating.

The Oil Component.

A requisite level of an oil or fat component is necessary for proper texture, mouthfeel, and melt. Too much oil and the emulsions will invert to a water-in-oil emulsion. Too little oil and the product would be dry and leathery, similar to a fruit roll-up or the like. Suitable oils include cottonseed oil, corn oil, canola oil, palm oil, coconut oil, soybean oil, and stabilized animal fat. The oils are generally partially hydrogenated, to give them a margarine-like consistency. The compositions of this invention generally include 10–40 weight-% partially hydrogenated soybean or other edible oil, which may be supplied in the form of 110° F. melt point flakes. A lower melt point oil may be used, but this may lead to cohesion of the particulates unless transported under conditions of refrigeration. Similar issues may manifest themselves in the final snack application during distribution.

The product of this invention exhibits basic oil-in-water (o/w) emulsion properties when the ratio of plasticizer+ water to oil is greater than 1:1. At ratios lower than this, the product inverts to a water-in-oil emulsion (w/o), similar in texture to chocolate or butter, and loses the desired protein gel attributes that approximate the texture to that of cheese.

The Flavor Characterizing Ingredient.

The Flavor Characterizing Ingredient is selected appropriately from the category of that which the final product is supposed to represent. In the case of fabricating a Cheddar cheese shred, for instance, it is often most pragmatic to use a ground 38% moisture Cheddar cheese as the Flavor Characterizing Ingredient. Many other robustly flavored fermented cheeses—including Brie, Parmesan, Pepper-Jack, and Roquefort—are likewise especially suitable as cheese Flavor Characterizing Ingredients. Cheese must be ground or shredded fine enough to properly disperse when blended with the other ingredients.

As previously stated, any moisture coming from cheese, tomatoes, beans, meat, or whatever product is being used as the Flavor Characterizing Ingredient must be taken into consideration when determining the amount of water to be used as a plasticizer ingredient. Conversely, if a dehydrated Flavor Characterizing Ingredient, such as a cheese powder, is used, the proper amount of water will have to be added to the composition in order to ensure the desired degree of plasticizing.

Dry savory Flavor Characterizing Ingredients—such as tomato powder, spray-dried sour cream, chopped dehydrated chives, and beef bouillon—may be combined with natural flavors or seasonings to create a range of shelf stable savory food particulates other than cheese-based particulates. Products of the present invention which can be produced in this way include "Sun Dried Tomato Melt-On Flakes", "Chili Sauce Melts", "Sour Cream and Chive Melting Sauce Granules", and "Teriyaki Beef Gravy Melts".

Additional Ingredients

Salt is utilized for flavor potentiation, to assist in controlling (reducing) the water activity, and to reduce the sweet flavor of the polyol plasticizer. The compositions of this invention may include up to 15 weight-% salt. At contents significantly higher than this, the salt may be in a supersaturated state regarding its environment, and would therefore tend to crystallize during product shelf life.

Starch (or flour, or other starch containing material) is preferably absent, or is present in amounts of less than 2% of the total composition weight. Instead of the product melting when the temperature is raised, the starch will gel and keep it in a semi-solid state, which—besides being unnatural to cheese texture—inhibits melting of the savory particulate and deters adhesion to substrates when used as a topping.

Coloring components (e.g., FD&C Yellow #5 and #6 and titanium dioxide) are chosen to give characteristic taste and color of the flavor (e.g., cheese) which the composition is intended to represent. A small amount of water, sufficient to help dispersion and solubility, can be added to the coloring components to facilitate their blending with the other ingredients of the compositions.

When the composition is intended to be cheese-like, the relative amounts of ingredients utilized are generally selected to provide a product that melts in the a physical manner that approximates that of natural cheese. However, the melt point may be optimized. For instance, the melt points of the specific embodiments described hereinbelow are actually about 30 F.° higher than the melt point of fresh Cheddar cheese.

Specific compositions of this invention, for instance, may be made up of approximately 21 weight-% glycerin, 7 weight-% sodium lactate solution (40% moisture, pH 6), 18 weight-% sodium caseinate (10% moisture), 21 weight-% partially hydrogenated soybean oil, 6 weight-% salt, 2.5 weight-% cheese flavoring, 0.5 weight-% of a mixture of FD&C #5 and #6 Food Coloring and titanium dioxide pigment, and either 24 weight-% Cheddar cheese (38% moisture) or 16 weight-% powdered dehydrated Cheddar cheese and 8 weight-% water.

Water Activity

The U.S. Food and Drug Administration defines a food product with a pH of greater than 4.6 as shelf stable only if it has a water activity of 0.85 or below. The products of the present invention will generally have pH levels greater than 4.6 and are defined as having water activities of 0.70 or below. The products of the present invention are, therefore, "shelf stable".

The water activity level of a product is a qualitative measure of unbound free water in a system that is available to support biological and chemical reactions. Two foods with the same water content can vary significantly in their water activities, depending on how much free water is in the system. When a food is in moisture equilibrium with its environment, the water activity of the food is quantitatively equal to the relative humidity in head space of a container containing the food, divided by 100. Water activity can be measured with commercially available equipment, such as the AQUA LAB CX-2 water activity meter available from Decagon Devices, Inc. High water activity products are susceptible to mold, fungus, and bacterial proliferation. Generally, as the water activity of a given food product decreases, its shelf life increases. In accordance with the present invention, the water activity $A_w$ is about 0.70 or below, preferably about 0.60 or below, more preferably less than about 0.50, and most preferably no greater than 0.43, particularly when the products are dry snack goods.

Processing:

Processing in accordance with the present invention can be accomplished in batch or continuous fashion. Both of these procedures include the basic steps of blending the ingredients, cooking, casting, and shaping (e.g., shredding or grinding).

BLENDING: All powdered components (e.g., sodium caseinate, salt, cheese flavor, $TiO_2$ colorant, and oil beads and cheese powder if used) are mixed in a blender capable of handling a viscous paste. Shredded cheese (if used), polyol plasticizer, sodium lactate, and liquidized food colorings are added slowly under agitation to the powdery mixture until a homogenous paste is formed.

COOKING: The resulting paste is fed through a steam-jacketed scraped-wall continuous heat exchanger (a THERMUTATOR or the like) via an auger-fed stuffing pump. Steam jacket temperature is adjusted on the heat exchanger so that the product reaches approximately 220° F. (or the minimum temperature at which the protein component is properly solubilized). At about 160–170° F., the protein in the dough-like mass begins to fully solubilize and it evolves from a "dough" to a melted, stringy Mozzarella texture. Since this material is very viscous, it requires strong agitation to properly disperse. Generally, but not necessarily, the product is recirculated through a high shear device such as a "Silverson" mixing pump to aid in building a good oil-in-water emulsion.

CASTING: After cooking, the product is cast, which entails pumping to a belt cooler or depositing on a sheet-type baking pan, where it is rolled to a height of about ⅜" and allowed to cool without being subjected to agitation. Any shear applied while the protein gel is setting or after is has set will break the protein gel and destroy the texture. It takes about 5–20 minutes for this structure to set, depending on product contact surface temperature and that of the environment. The consistency after cooling is similar to a Parmesan cheese (firmer than standard Cheddar). The protein gel begins to form as the product approaches 160° F.

SHREDDING/SIZING: After the product is cooled (gelled) it is sliced into 8"×12" (x⅜") slabs, cubed, and shredded through a conventional process (such as an Urschel cheese shredder). The optimum temperature for cutting is 130° F., for cubing is 100° F., and for shredding is 45° F. A flow agent such as microcrystalline cellulose or he like may be blended with the shreds to reduce cohesion during shelf life. At this point, for most purposes the product can be treated like a conventional cheese shred. While shredding is the preferred particle reduction sizing technique because of its low kinetic thermal input to the product, other "slicing" type size reduction techniques may be successfully employed in this invention.

ALTERNATIVE PROCESSING CONSIDERATIONS: Those skilled in the art will realize that such a product could be formed and cut via dies in a simple cooking extrusion process. Due to the fragility of the emulsion and tremendous pressure necessary to extrude this product through dies with a cross-sectional approximation of a cheese shred, however, the product separates into its two component phases. Lower fat compositions can be manufactured in this manner, but then texture is not representative of cheese and the "shreds" have a synthetic noodle-like geometry and do not look thin, shaven, and random, as would a natural cheese shred.

SPECIFIC EXAMPLES

The following specific Examples of the present invention make use of: glycerin obtained from Brenntag Great Lakes of Milwaukee, Wis.; sodium lactate solution (40% moisture, pH 6) obtained from Xena International of Polo, Ill.; KAORICH 120° F. Melt Vegetable Oil Beads obtained from Loders Croklaan of Channahon, Ill.; BAKEALL F072 Beef Fat Shortening obtained from Bunge Foods of Bradley, Ill.; Standard Light Autolyzed Yeast Extract obtained from Food Ingredient Specialties of Solon, Ohio; Natural Cheese Flavor D2905L and Sun-Dried Tomato Flavoring D2921T, both obtained from Mastertaste Inc. of Chicago, Ill.; Tomato Paste obtained from Contadina Foods Inc. of San Francisco, Calif.; Refried Beans obtained from La Preferida of Chicago, Ill.; CT 1236 Dehydrated Cheddar Cheese Powder, Sour Cream and Chive Seasoning 6405, Beatreme 1755 Sour Cream Powder, Cajun Beef Seasoning CS40060, and Teriyaki Beef Base 54050, all obtained from Kerry Inc. of Beloit, Wis.; salt (flour grind); FD&C Yellow #5 and #6 Food Dyes obtained from Warner Jenkinson of St. Louis Mo.; and titanium dioxide Food Colorant obtained from Warner Jenkinson of St. Louis, Mo.

Example 1

This is a benchtop batch method of preparation, using the following dry cheese recipe:

| Ingredient | Weight (grams) | Weight-% (approximate) |
|---|---|---|
| Glycerin | 315 | 21 |
| Sodium lactate solution (40% moisture, pH 6) | 105 | 7 |
| Sodium caseinate | 270 | 18 |
| KAORICH 120° F. Melt Vegetable Oil Beads | 315 | 21 |
| CT 1326 dehydrated Cheddar cheese powder | 255 | 17 |
| Water | 120 | 8 |
| Standard light autolyzed yeast extract | 22.5 | 1.5 |
| Natural Cheese Flavor (Mastertaste D2905L) | 1.5 | 0.1 |
| Salt | 90 | 6 |
| FD&C Yellow #5 | 0.75 | 0.05 |
| FD % C Yellow #6 | 0.75 | 0.05 |
| TiO₂ food coloring | 4.5 | 0.3 |
| | 1500 grams total | |

The sodium caseinate, partially hydrogenated vegetable oil beads, powdered dehydrated Cheddar cheese, cheese flavors, salt, and titanium dioxide coloring are placed into a KITCHENAID tilt-head type mixer bowl and blended for 1 minute. The FD&C Yellow #5 and #6 food colorings are added to the water in a 250 ml beaker and dissolved. The glycerin, sodium lactate, and color/water mixture are added into a Stephan Model UMC 5 dual agitator jacketed mixer with hot oil supply to the jacket. The oil temperature in the supply is adjusted to approximately 260° F., but is not circulated to the jacket at this time. The dry mix is added to the liquids in the bowl, and the mixture is blended until a cohesive paste forms. The oil supply to the jacket is engaged, the outer (wall sweeping) agitator is turned on, and the mixture is heated to 200–220° F. (preferably, 210° F.). At approximately 165° F., the protein begins to hydrate and the mix changes from a dough-like appearance to one that resembles stringy melted cheese with a degree of separated oil. As heating continues, the oil phase is incorporated into the proteinaceous matrix. When the product reaches 200° F., the high speed inner agitator is turned on for the remaining heating period, or until the oil phase is completely incorporated into the matrix.

At this point the product is ready to cast. It should not be held too long in the mixer or undesirable browning may occur. The melted matrix is poured onto a baking pan (metal or high strength polymer) that has been pre-coated with an anti-sticking agent such as a blend of lecithin and oil. The product is spread to a depth of ⅜ to ½ inches with a TEFLON-coated rolling pin and subjected to a stream of cool moving air provided by a fan or air conditioner.

After cooling, the cast sheet is dissected into pieces approximately 6"×2.5" (×⅜–½"). These pieces are shredded with a kitchen-variety of hand cheese shredder, such that the ⅜–½ inch dimension has perpendicular travel orientation relative to the cutting louvers, producing a shred of length proportioned by the original casting height.

Example 2

This is a pilot plant batch method of preparation, using the following full moisture cheese recipe:

| Ingredient | Weight (grams) | Weight-% (approximate) |
|---|---|---|
| Glycerin | 3150 | 21 |
| Sodium lactate solution (40% moisture, pH 6) | 1050 | 7 |
| Sodium caseinate | 2700 | 18 |
| KAORICH 120° F. Melt Vegetable Oil Beads | 3150 | 21 |
| Cheddar cheese (38% moisture) | 3750 | 25 |
| Standard light autolyzed yeast extract | 225 | 1.5 |
| Natural Cheese Flavor (Mastertaste D2905L) | 15 | 0.1 |
| Salt | 900 | 6 |
| FD&C Yellow #5 | 7.5 | 0.05 |
| FD % C Yellow #6 | 7.5 | 0.05 |
| TiO₂ food coloring | 45 | 0.3 |
| | 15000 grams total | |

The glycerin, sodium lactate, and color/water mixture are placed into a Stephan Model UMM SK24E swept wall agitated vat and heated to 120–140° F. When water-soluble colorants are used, they are generally premixed with the water or with the sodium lactate solution (since water soluble dyes dissolve best in hydrophilic solvents). The sodium caseinate and vegetable oil beads are dispersed and melted into this mixture. Salt, cheese flavors, and titanium dioxide colorant are added last. The cheese flavor is pre-blended with the salt, a technique referred to as "plating", since this aids in quick dispersion of the flavors into the surrounding medium. Steam is then applied to the outer jacket of the vat at approximately 20 psi (temperature equivalent to approximately 259° F.) to quickly heat the mixture to the desired end point of 200–230° F. (preferably, 210° F.). At approximately 165° F., the protein begins to hydrate and the mix changes from a dough-like appearance to one that resembles stringy melted Mozzarella cheese. Since this material is very viscous, it requires strong agitation to properly disperse it. There may be separation of oil at this point, but continued thermal input, along with generous agitation, causes the oil to form a homogenous emulsion as the temperature approaches 200° F. Generally, but not necessarily, the product is recirculated through a high shear mixing device such as a Silverson Mixing Pump to aid in building a good oil-in-water emulsion.

Upon reaching the desired temperature and consistency, the product is ready to cast. Excess hold time at final cook temperature will result in color and flavor degradation from Maillard browning reactions, and the emulsion will eventually break down causing separation of the oil. The melted matrix is poured onto a baking pan (metal or high strength polymer) that has been pre-coated with an anti-sticking agent such as a blend of lecithin and oil. The product is spread to a depth of ⅜ inches and subjected to a stream of cool moving air provided by a fan or air conditioner.

The slabs of cheese product thus produced are passed into a Urschel Model M dicer, with blades adjusted to provide longitudinal and transverse cuts at ½ inch intervals. The resulting ½"×½"×⅜" cubes are passed through a Urschel Model CC shredder with appropriate head and knife spacing to give desired sizing. A typical angel hair cut size employs a V-cut head with a −0.030-inch knife set point. A flow agent (microcrystalline cellulose at 1.5% shred weight) is added to the surface of the shreds to prevent coalescence. The shreds are packaged into 40 pound polyethylene-lined cardboard boxes.

Example 3

A similar pilot plant method can be used to produce the higher moisture ($A_w$ approximately 0.70) Romano cheese shred variant indicated by the following formula:

| Ingredient | Weight (grams) | Weight-% (approximate) |
|---|---|---|
| Glycerin | 1875 | 12.5 |
| Sodium lactate solution (40% moisture, pH 6) | 900 | 6 |
| Sodium caseinate | 2100 | 14 |
| KAORICH 120° F. Melt Vegetable Oil Beads | 1350 | 9 |
| Romano cheese (33% moisture) | 5100 | 34 |
| Standard light autolyzed yeast extract | 225 | 1.5 |
| Salt | 750 | 5 |
| TiO$_2$ food coloring | 30 | 0.2 |
| Propylene glycol | 450 | 3 |
| Polysorbate 60 | 15 | 0.1 |
| Water | 2205 | 14.7 |
| | 15000 grams total | |

Example 4

This is a pilot plant continuous method of preparation, using the following full moisture cheese recipe:

| Ingredient | Weight (pounds) | Weight-% (approximate) |
|---|---|---|
| Glycerin | 105 | 21 |
| Sodium lactate solution (40% moisture, pH 6) | 35 | 7 |
| Sodium caseinate | 90 | 18 |
| KAORICH 120° F. Melt Vegetable Oil Beads | 105 | 21 |
| Cheddar cheese (38% moisture) | 125 | 25 |
| Standard light autolyzed yeast extract | 7.5 | 1.5 |
| Natural Cheese Flavor (Mastertaste D2905L) | 0.5 | 0.1 |
| Salt | 30 | 6 |
| FD&C Yellow #5 | 0.25 | 0.05 |
| FD % C Yellow #6 | 0.25 | 0.05 |
| TiO$_2$ food coloring | 1.5 | 0.3 |
| | 500 pounds total | |

Blocks of Cheddar cheese (38% moisture content) weighing 60 pounds are cut into 1 inch by 1 inch cubes with a wire cheese press. The cubes are shredded through an Urschel Model CC shredder with a V-cut shredding head. The shredded cheese is packaged in 50-pound polyethylene-lined cardboard boxes. Separately, in a 5 gallon stainless steel vat with a propeller-type agitator, FD&C Yellow #5 and #6 colorants are blended with a sodium lactate solution (40% moisture, pH 6). Glycerin is added to a separate 50 gallon stainless steel vat with propeller-type agitation, and the color/sodium lactate solution is slowly added and blended in. The resulting liquid mixture is packaged in 50 gallon lined steel drums. Separately, in a ribbon-type dry blender, sodium caseinate (10% moisture), salt, powdered cheese flavoring, and titanium dioxide are blended and the powdery mixture is packaged in 50 pound bags.

The powdery mixture is charged into a heavy duty ribbon blender with end discharge capabilities (from RMF Steel Products Co.) and with agitation cheese shreds are slowly added and mixed for approximately 3 minutes. The liquid blend is then slowly added and mixed for approximately 5 minutes or until a uniform paste is achieved. The paste is packaged in 50 pound polyethylene lined boxes.

The product is cooked in an auger stuffing apparatus (Doering Model 35PF) feeding a lobe timing pump (Waukesha Model 30) feeding a rotary impeller-scraped wall heat exchanger (Cherry Burrell Model Votator 2). Two-inch stainless dairy grade pipe is employed for all fluid transfers.

The paste is transferred into the auger feeder and the pump speed is adjusted to 500 pounds per hour throughput into the heat exchanger. The impeller speed of the heat exchanger is adjusted to 120 RPM. The steam pressure feeding the heat exchanger is adjusted to that required to provide a product temperature of 220° F. at the outlet. This pressure is generally about 40 psi. The now "molten" product is piped from the outlet to the casting belt as described below.

The casting line consists of an 18-foot long, 32-inch wide solid stainless conductive variable speed cooling belt (from Berndorf Belt Systems), a gauging roll to flatten product to the desired thickness, and a cutting apparatus. The product is evenly distributed onto the belt surface via a multiport manifold. On the belt, it travels 1 to 2 feet before it reaches the gauging roller, which is typically set for a thickness of ⅜ inches. The belt speed is adjusted to give a lateral product spread to within 3 inches of the edge, in order to utilize as much of the surface as possible. After the gauging roller, the belt travels over a zone where 25° F. propylene glycol is sprayed on the underside of the belt to conductively remove heat from the molten product, causing the protein therein to form a soft gel. At this point (product temperature 130° F.), the product is cut transversely with a polypropylene knife at 8-inch intervals, in effect forming ⅜-inch by 8-inch by 26-inch blocks. Feed rate and belt speed are adjusted to that required to permit the product to cool to an average temperature (between top and bottom) of 45° F. The product is removed at the end of the belt, with an Ultra-High Molecular Weight polyethylene scraper attached at an angle of 50 degrees with respect to the arc of the belt pulley.

The slabs of cheese product thus produced are passed into a Urschel Model M dicer, with blades adjusted to provide longitudinal and transverse cuts at ½ inch intervals. The resulting ½"×½"×⅜" cubes are passed through a Urschel Model CC shredder with appropriate head and knife spacing to give desired sizing. A typical angel hair cut size employs a V-cut head with a −0.030-inch knife set point. A flow agent (microcrystalline cellulose at 1.5% shred weight) is added to the surface of the shreds to prevent coalescence. The shreds are packaged into 40 pound polyethylene-lined cardboard boxes.

Example 5

This is an ingredient listing for a chili (tomato and refried bean) embodiment of the present invention:

| Ingredient | Weight (grams) | Weight-% (approximate) |
|---|---|---|
| Glycerin | 255 | 17 |
| Sodium caseinate | 300 | 20 |

-continued

| Ingredient | Weight (grams) | Weight-% (approximate) |
|---|---|---|
| KAORICH 120° F. Melt Vegetable Oil Beads | 300 | 20 |
| Refied beans (canned, 75% moisture) | 405 | 27 |
| Tomato paste (canned, 75% moisture) | 120 | 8 |
| Salt | 90 | 6 |
| Cajun Beef seasoning (KERRY CS400600) | 28.5 | 1.9 |
| Sun-Dried Tomato flavoring (Mastertaste D2921T) | 1.5 | 0.1 |
| | 1500 grams total | |

All ingredients are added to a Stephan Model UMC 5 dual agitator jacketed mixer with hot oil supply to the jacket. The oil temperature in the supply is adjusted to approximately 260° F., but is not circulated to the jacket at this time. The ingredients are blended until a cohesive paste forms. The oil supply to the jacket is engaged, the outer (wall sweeping) agitator is turned on, and the mixture is heated to 225–235° F. (preferably, 230° F.). At approximately 165° F., the protein begins to hydrate and the mix changes from a dough-like appearance to one that resembles stringy melted cheese with a degree of separated oil. As heating continues, the oil phase is incorporated into the proteinaceous matrix. When the product reaches 230° F., the high speed inner agitator is turned on for the remaining heating period, or until the oil phase is completely incorporated into the matrix.

At this point the product is ready to cast. It should not be held too long in the mixer or undesirable browning may occur. The melted matrix is poured onto a baking pan (metal or high strength polymer) that has been pre-coated with an anti-sticking agent such as a blend of lecithin and oil. The product is spread to a depth of ⅜ to ½ inches with a TEFLON-coated rolling pin and subjected to a stream of cool moving air provided by a fan or air conditioner.

After cooling, the cast sheet is dissected into pieces approximately 6"×2.5" (×⅜–½"). These pieces are shredded with a kitchen-variety of hand cheese shredder, such that the ⅜–½ inch dimension has perpendicular travel orientation relative to the cutting louvers, producing a shred of length proportioned by the original casting height. Alternatively the pieces can be ground with a food processor to produce random "chunk" sizes.

Example 6

This is an ingredient listing for a sour cream and chive embodiment of the present invention:

| Ingredient | Weight (grams) | Weight-% (approximate) |
|---|---|---|
| Glycerin | 330 | 22 |
| Sodium lactate solution (40% moisture, pH 6) | 90 | 6 |
| Sodium caseinate | 300 | 20 |
| KAORICH 120° F. Melt Vegetable Oil Beads | 150 | 10 |
| Ethyl alcohol | 30 | 2 |
| Sour Cream and Chive seasoning 6405 | 120 | 8 |
| Beatreme 1755 Sour Cream powder | 255 | 17 |
| Salt | 45 | 3 |
| Water | 180 | 12 |
| | 1500 grams total | |

Example 7

This is an ingredient listing for a Teriyaki beef embodiment of the present invention:

| Ingredient | Weight (grams) | Weight-% (approximate) |
|---|---|---|
| Glycerin | 300 | 20 |
| Sodium lactate solution (40% moisture, pH 6) | 105 | 7 |
| Sodium caseinate | 270 | 18 |
| BAKEALL f072 Beef Fat shortening | 300 | 20 |
| Beef extract (80% solids) | 270 | 18 |
| Teriyaki beef base 54050 | 90 | 6 |
| Salt | 45 | 3 |
| Water | 120 | 8 |
| | 1500 grams total | |

Shelf-stability Data:

Tests relevant to shelf stability include determinations of Aerobic Plate Count (APC), Yeast, and Mold. APC is an indication of the total organisms that grow in the presence of oxygen. Products of the present invention when aged for 10 months were found to have APC's ranging from 200–600 viable cells per gram, Yeast counts of less than 10 viable cells per gram, and Mold counts of less than 10 viable cells per gram. These numbers are all well within industry standards, which would require APC's of less than 100,000 viable cells per gram, Yeast counts of less than 50 viable cells per gram, and Mold counts of less than 50 viable cells per gram.

Using the Product:

The cheese shreds may be spread over potato chips, corn tortillas, or the like with a device such as a pizza cheese spreader. The snack substrate should be distributed evenly allowing the maximum amount of exposed surface. The cheese covered snack is then subjected to a temperature high enough to melt the cheese shreds, about 170° F., and cooled to a point where the product sets up to a firm gel (or solid) prior to packaging (so the chips do not stick together).

The uses for the product of this invention extend beyond snack chips to include toppings for bread, bakery, or food "bars", and the like, or as a component in "boxed" meals.

The above disclosure illustrates the present invention. However, those skilled in the art will readily conceive of variations in general accordance with the teachings herein. Accordingly, this invention also contemplates those modifications and alternative constructions and processing techniques that fall within the scope of the following claims.

What is claimed is:

1. A savory, shelf-stable, particulate, meltable, food-grade plasticized composition, said composition having a water activity $A_w$ of less than 0.50 and comprising an oil-in-water emulsion of:
- 10–30% weight-% of a protein that forms a thermally reversible meltable gel;
- 15–50 weight-% of plasticizer components to solubilize the protein, comprising 10–40 weight-% of a polyol plasticizer by weight of the plasticized composition and 3–15 weight-% of a non-polyol plasticizer by weight of the plasticized composition;
- 10–40 weight-% of an edible oil;
- 5–25 weight-% moisture; and
- 10–40 weight-% of a savory flavoring component.

2. The savory, shelf stable composition of claim 1, wherein the water activity is less than or equal to about 0.43.

3. The savory, shelf-stable composition of claim 1, wherein the protein is casein, the polyol plasticizer is glycerin, the non-polyol plasticizer is sodium lactate, the oil component is partially hydrogenated soybean oil, and the flavoring component is a cheese flavor.

4. The savory, shelf-stable composition of claim 3, comprising about 18 weight-% casein, about 21 weight-% glycerin, about 7 weight-% sodium lactate, about 21 weight-% partially hydrogenated soybean oil, and about 24 weight-% cheese component.

5. The savory, shelf-stable composition of claim 1, wherein the protein is casein, the polyol plasticizer is glycerin, the non-polyol plasticizer is sodium lactate, the oil component is stabilized animal fat, and the flavoring component is a meat flavor.

6. The savory, shelf-stable composition of claim 5, comprising about 18 weight-% casein, about 20 weight-% glycerin, about 7 weight-% sodium lactate, about 18 weight-% stabilized animal fat, and about 25 weight-% meat extract and seasoning component.

7. The savory, shelf-stable composition of claim 1, wherein the flavoring component is a vegetable component.

8. The savory, shelf-stable composition of claim 7, wherein the protein is casein, the polyol plasticizer is glycerin, the non-polyol plasticizer is comprised of monosaccharides originating from the vegetable component, the oil component is partially hydrogenated vegetable oil, and the flavoring component includes vegetable flavor.

9. The savory, shelf-stable composition of claim 8, comprising about 20 weight-% casein, about 17 weight-% glycerin, about 35 weight-% vegetable component, about 20 weight-% partially hydrogenated vegetable oil, and about 8 weight-% salt and seasoning component.

* * * * *